United States Patent
Asakawa et al.

(10) Patent No.: US 9,792,834 B2
(45) Date of Patent: Oct. 17, 2017

(54) COMPUTER, METHOD AND PROGRAM FOR EFFECTIVELY NOTIFYING OTHERS OF PROBLEMS CONCERNING ACCESSIBILITY IN CONTENT

(75) Inventors: Chieko Asakawa, Yokohama (JP); Shinya Kawanaka, Komae (JP); Daisuke Sato, Yamato (JP); Hironobu Takagi, Yokohama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1154 days.

(21) Appl. No.: 12/399,073

(22) Filed: Mar. 6, 2009

(65) Prior Publication Data
US 2009/0228573 A1 Sep. 10, 2009

(30) Foreign Application Priority Data

Mar. 6, 2008 (JP) .................................. 2008-57030

(51) Int. Cl.
*G09B 21/00* (2006.01)
*G09B 5/04* (2006.01)

(52) U.S. Cl.
CPC ............. *G09B 21/006* (2013.01); *G09B 5/04* (2013.01)

(58) Field of Classification Search
USPC .................................................. 709/204–207
See application file for complete search history.

(56) References Cited

U.S. PATENT DOCUMENTS

| 2002/0156799 A1* | 10/2002 | Markel et al. ................. 707/202 |
| 2006/0095252 A1 | 5/2006 | Takagi et al. |
| 2006/0100883 A1 | 5/2006 | Miyamoto et al. |
| 2006/0150075 A1* | 7/2006 | Dietl et al. ................. 715/501.1 |
| 2007/0150556 A1 | 6/2007 | Fukuda et al. |
| 2008/0040115 A1 | 2/2008 | Asakawa et al. |

(Continued)

FOREIGN PATENT DOCUMENTS

| JP | 2000003126 A | 1/2000 |
| JP | 2003085087 A | 3/2003 |

(Continued)

OTHER PUBLICATIONS

Japanese Patent Office, Japanese Patent Application JP2008057030, dated Jul. 12, 2012, Search Report by Registered Searching Organization, pp. 1-25, includes English translation.

(Continued)

*Primary Examiner* — Jackie Zuniga Abad
(74) *Attorney, Agent, or Firm* — Kurt P. Goudy; Otterstedt, Ellenbogen & Kammer, LLP

(57) ABSTRACT

A computer has a display device, a speaker device and an input device, and is capable of identifying problems concerning accessibility in web content displayed on the display device to a visually impaired user of the computer. The web content includes a plurality of structured objects. The computer also has text-to-speech capability such that the web content displayed on the display device is audibly read to the user. The user provides a specification operation input when he or she is uncomfortable with the audible reading. A reporter software module executing on the computer determines which one of the structured objects is causing the discomfort.

16 Claims, 8 Drawing Sheets

(56) References Cited

U.S. PATENT DOCUMENTS

2008/0126887 A1* 5/2008 Brodeur et al. ............... 714/57
2008/0276163 A1 11/2008 Takagi et al.
2013/0061137 A1 3/2013 Miyamoto et al.

FOREIGN PATENT DOCUMENTS

| JP | 2004348211 A | 12/2004 |
|---|---|---|
| JP | 2006039461 | 2/2006 |
| JP | 2006048636 A | 2/2006 |
| JP | 2006119534 | 5/2006 |
| JP | 2007140642 | 6/2007 |
| JP | 2007172377 | 7/2007 |
| JP | 2007249755 | 9/2007 |
| WO | 2004097656 | 4/2004 |

OTHER PUBLICATIONS

Japanese Patent Office, Japanese Patent Application JP2008057030, dated Jul. 31, 2012, Notification of Reasons for Refusal, pp. 1-8, includes English translation.

\* cited by examiner

COMPUTER, METHOD AND PROGRAM FOR EFFECTIVELY NOTIFYING OTHERS OF PROBLEMS CONCERNING ACCESSIBILITY IN CONTENT

CROSS-REFERENCE TO RELATED APPLICATION

This application claims priority under 35 U.S.C. §119 from Japanese Patent Application No. 2008-57030 filed on Mar. 6, 2008, the entire contents of which are incorporated herein by reference.

BACKGROUND OF THE INVENTION

Field of the Invention

The present invention relates to an information processing technology, and more particularly relates to a computer, a method and a program for more accurately and more easily notifying others of problems concerning accessibility of content.

Description of Related Art

Generally, when there is an error or problem in web content, correction or modification is performed as described below:

FIG. 8 is a conceptual diagram showing a conventional network system and its scenario for correcting web content. A web creation computer 201, a web server 202 and a user computer 101 are connected so as to be able to communicate with each other via the Internet. First, a web manager (or web creator) D creates web content (arrow S1) and uploads the web content onto the web server 202 (arrow S2). A user U downloads the web content into the user computer 101 (arrow S3) and allows the user computer 101 to display the web content on its screen (arrow S4). Here, if there is an error or problem in the web content, the user U notifies the web manager D of the problem by use of a predetermined contact form or by e-mail (arrow FB) and expects the web manager D to correct the problem as soon as possible. Such techniques are disclosed in, for example, Japanese Patent Application Publication No. 2003-85087, Japanese Patent Application Publication No. 2004-348211, Japanese Patent Application Publication No. 2006-48636, and Japanese Patent Application Publication No. 2000-3126.

However, in the case where the user U is a visually-impaired person, notification of the problem to the web manager D is not necessarily simple.

The visually-impaired person recognizes the web content through hearing by using software, for example, a screen reader, for reading the web content aloud based on predetermined rules. Meanwhile, a sighted person mainly visually recognizes the web content by using software, for example, a web browser, for displaying the web content based on predetermined rules. However, it is difficult for a visually-impaired person to determine which part of the entire displayed web content corresponds to a specific part of the web content which has been read aloud at a certain time.

As an example, the reading speed of the screen reader for the visually-impaired person can be higher than the reading speed of the sighted person. Moreover, the screen reader also reads attribute information that is not displayed by the web browser in addition to the normal text information displayed by the web browser. For example, for the object "<h1>Weather</h1>", while the web browser displays the object as "Weather", the screen reader reads the object as "Heading level 1 Weather". Thus, it is even more difficult to associate the displayed web content with the web content read aloud.

In this regard, there is a screen reader which makes it easier to some extent to associate both of the content types above with each other by including a function for moving a mouse cursor to the position of an object that is being read. However, the position of the mouse cursor does not reliably point to the object being currently read on a document object model (DOM). Thus, the above function is not necessarily sufficient.

SUMMARY OF THE INVENTION

It is an object of the present invention to provide a computer, a method, and an article of manufacture which tangibly embodies computer readable instructions for executing a computer program for more accurately and more easily identifying problems concerning accessibility in content and notifying others of the problems.

In order to solve the foregoing problems, the present invention can employ the following configuration: a computer for identifying problems concerning accessibility in content, the computer having a display device, a speaker device and an input device, for identifying problems concerning accessibility in content, the computer configured to include: display means for displaying on the display device content containing a plurality of structured objects; conversion means for converting the content into reading information based on predetermined rules; reading means for reading the converted reading information through the speaker device; history means for obtaining a history of operations of the input device by a user, the history including an operation by the user in response to a reading corresponding to a specific object; and identification means for identifying the specific object based on the reading information and the operation history.

Here, the operation by the user in response to a reading corresponding to the specific object may be an operation corresponding to a notification that there is a flaw in the reading corresponding to the specific object. Moreover, the reading means can also change the reading order according to operations by the user. Furthermore, the content can also be grasped as web content described by a document object model (DOM), and the plurality of objects can also be grasped as corresponding to a plurality of DOM nodes. Moreover, reading information corresponding to one object and reading information corresponding to another object can be separated by the user operation.

As to identification of the specific object, the content and the reading information can include text information, and the identification means can also identify the specific object based on a match or mismatch between words in the text information. Moreover, the content can include tag information, the reading information can include attribute information, and the identification means can also identify the specific object based on correspondence or/non-correspondence between the tag information and the attribute information. Furthermore, the computer further includes a pointer device, as the input device, for pointing to a certain position on the display device. The identification means can also identify the specific object based on the position. In this event, when the position pointer is outside a display area of the content in the display device, the identification means can identify the specific object from among the objects present within the display area.

In order to share the problems recognized by the user with other users, the following configuration can be further employed. Specifically, the computer can further include: a communication device capable of communicating with another different computer; and uploading means for uploading the identified specific object to the different computer through the communication device. Moreover, in order to give the other users more detailed explanation concerning the problems recognized by the user, the uploading means can also upload, to the different computer, the identified specific object together with a comment by the user. In order to allow the other users to more easily understand the problems recognized by the user, the uploading means can also upload the identified specific object in a mode that allows visual display of the object in the different computer. Moreover, the uploading means can also upload the identified specific object in a mode that allows reproduction of the user operation in the different computer. Furthermore, the uploading means can also upload the identified specific object in a mode that allows visual display of the object in the different computer and in a mode that allows reproduction of the user operation in the different computer.

Further, there is provided a method and a computer readable article of manufacture allowing a computer to perform the functions of the system.

Accordingly, the present invention provides a method employed by a computer including a display device, a speaker device and an input device, for identifying problems concerning accessibility in content, the method including the steps of: displaying on the display device content containing a plurality of structured objects; converting the content into reading information based on predetermined rules; reading the converted reading information through the speaker device; obtaining a history of operations of the input device by a user, the history including an operation by the user in response to a reading corresponding to a specific object; and identifying the specific object based on the reading information and the operation history.

Also provided is a computer readable article of manufacture tangibly embodying computer readable instructions for executing a computer implemented method in accordance with the present invention by a computer including a display device, a speaker device and an input device, for identifying problems concerning accessibility in content.

Although the present invention has been briefly described above as a computer system, the present invention can also be grasped as a method, a program or a program product. The program product can include, for example, a storage medium storing the program described above or a medium for transmitting the program. Note also that in the above summary of the invention, a combination or sub-combination of the components described above can also be incorporated in the invention.

BRIEF DESCRIPTION OF THE DRAWINGS

The above and other objects, features and advantages of the invention will become more apparent from the detailed description of embodiments of the present invention taken in conjunction with the accompanying drawings.

DETAILED DESCRIPTION OF THE PREFERRED EMBODIMENTS

Figure 1:
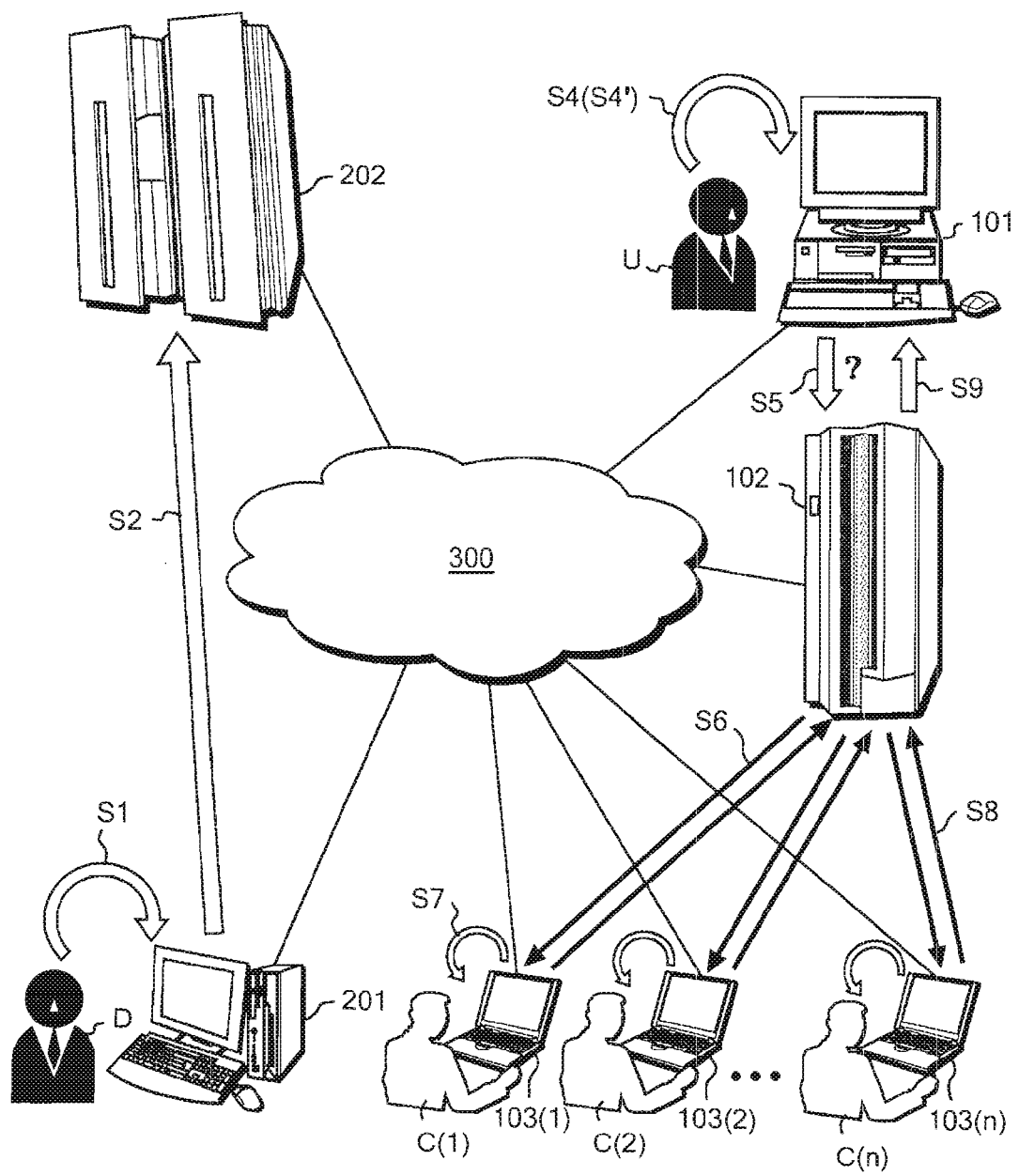
FIG. 1 is a diagram showing an embodiment of a network system (social accessibility system) and its scenario for use, the system including a computer on which the present invention is implemented.

The best mode for carrying out the present invention will be described in detail below with reference to the drawings. However, the following embodiments are not intended to limit the present invention according to the claims, and all combinations of features described in the embodiment are not necessarily essential to the implementation of the present invention.

Moreover, the present invention can be implemented in many different modes and thus should not be construed as being limited to the content described in the embodiments. Furthermore, it should be noted that all combinations of features described in the embodiments are not necessarily essential to the solving means of the present invention. Throughout the description of the embodiments, unless otherwise noted, components are denoted by the same reference numerals.

FIG. 1 is a diagram showing an embodiment of a network system (social accessibility system) and its scenario for use, the system including a computer to which the present invention is applied. A configuration of the social accessibility system is described here. This system includes a user terminal (computer) 101, an accessibility server 102 and member terminals 103 (1) to 103 (n). Moreover, a normal web management terminal 201 and a web server 202 are connected so as to be able to communicate with each other via the Internet 300.

An example of the scenario of the social accessibility system is now described. First, a web manager (or web creator) D creates web content (arrow S1) and uploads the web content onto the web server 202 (arrow S2). A visually-impaired user U downloads the web content into the user terminal 101 from the web server 202 (arrow S3) and allows the user terminal 101 to display and read the web content (arrow S4).

Here, when the web content contains an error or problem concerning accessibility, the user U uploads a report pointing out the error part of the content to the accessibility server 102 from the user terminal 101 (arrow S5). E-mails or various messages indicating the event that the report has been uploaded are widely transmitted to the member terminals 103 (1) to 103 (n) (arrow S6). Based on the uploaded report and the web content from the web server 202, members C (1) to C (n) of a community that approves social accessibility identify the errors pointed out by the user U and create accessibility metadata to improve and correct the errors (arrow S7). The accessibility metadata is uploaded to the accessibility server 102 from the member terminal 103 (i) (arrow S8). In the case where the user U accesses the web content afterward, the accessibility metadata is downloaded into the user terminal 101 from the accessibility server 102 (arrow S9) to allow the web content to be correctly read by the user terminal 101 (arrow S4').

Figure 8:
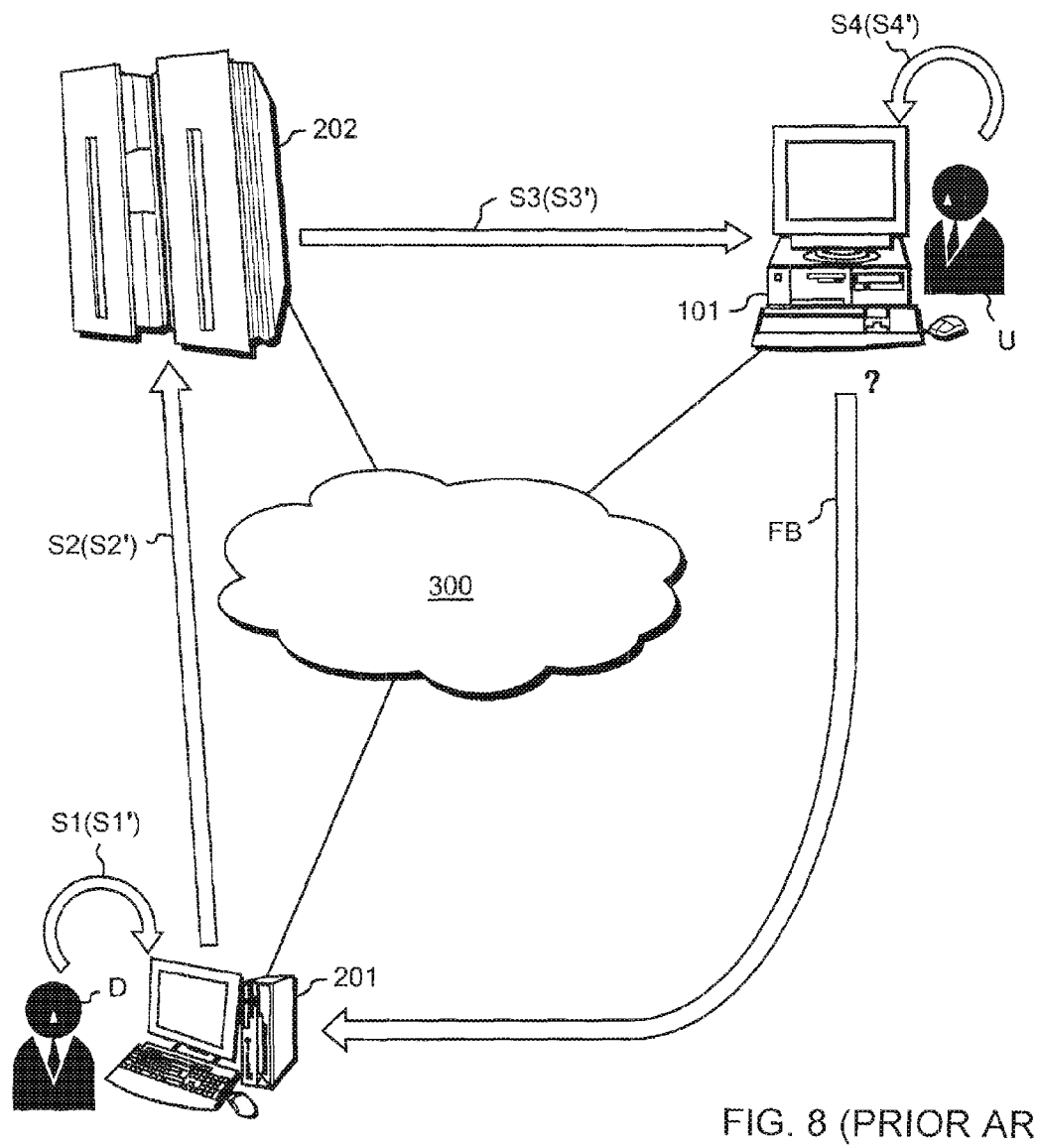
FIG. 8 is a conceptual diagram showing a conventional network system and its scenario for correcting web content.

Compared with a conventional content correction scenario (see FIG. 8), an advantage of the social accessibility system is that improvement and correction of accessibility problems or errors can be realized in cooperation with the members of the community that broadly supports the idea of accessibility without relying on the web manager D alone. Moreover, one of the technology components that support the social accessibility system is the technology of more accurately and more easily notifying others of problems concerning the accessibility. Below, details of the technology will be described.

Figure 2:
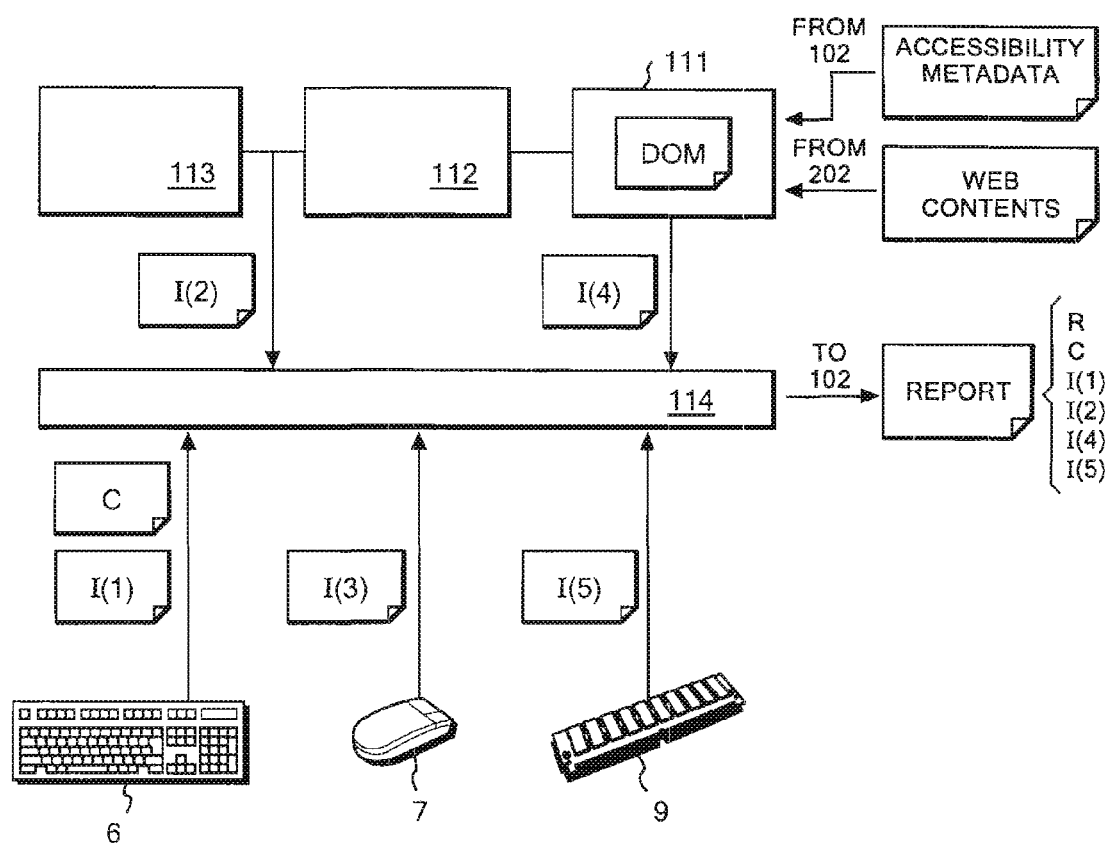
FIG. 2 is a functional block diagram showing functions of the user terminal.

FIG. 2 is a functional block diagram showing functions of the user terminal 101. The user terminal (computer) 101 includes a web browser (display means and downloading means) 111, a screen reader (conversion means) 112, a text-to-speech engine (reading means) 113, and a reporter (history means, identification means, and uploading means) 114. Note that functions of the above components are allocated as needed. Thus, multiple functions may be integrated into a single component or a single function may be divided and allocated to a plurality of the components. Moreover, the components shown in the functional block diagram of FIG. 2 can be implemented by allocating hardware resources and software to operate with each other by loading an operating system, middleware and a computer program such as an application program, all of which are stored in a hard disk drive 13, for example, into a main memory 4 and then reading those into a main CPU 1 in an information processor having a hardware configuration to be described later with reference to FIG. 7.

Figure 3:
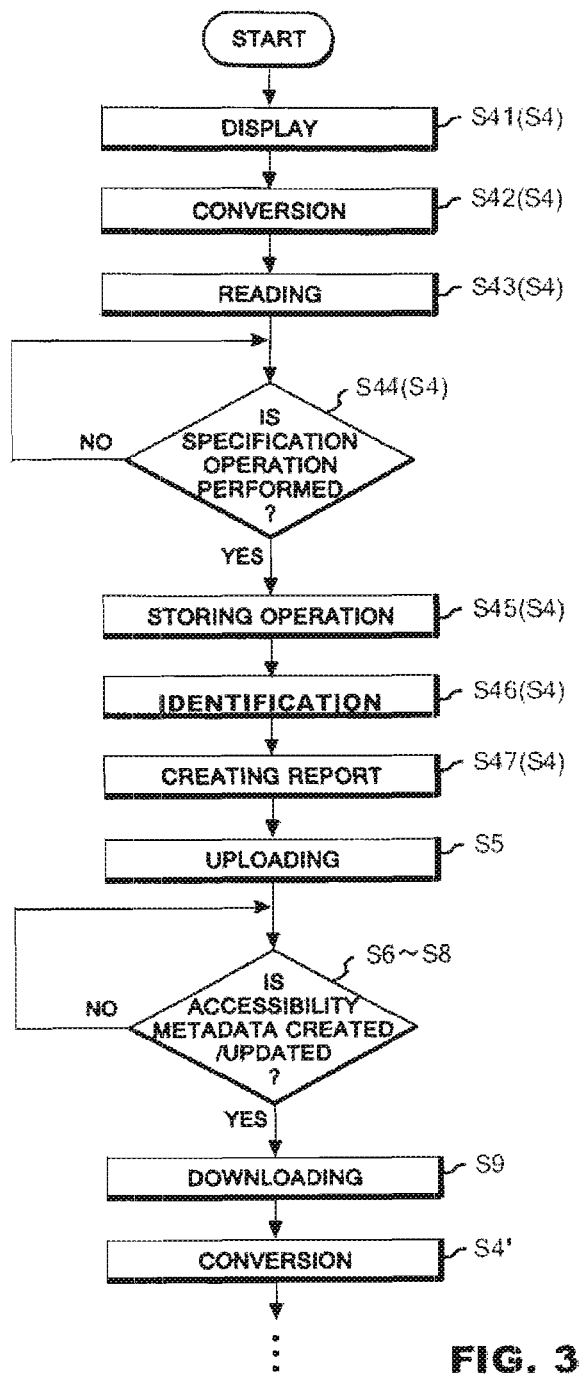
FIG. 3 is a flowchart showing operations of the user terminal.

FIG. 3 is a flowchart showing operations of the user terminal 101. In response to an access of the user U to a website, web content is downloaded into the user terminal 101 from the web server 202. The web content includes a plurality of objects structured by a DOM (document object model), and each of the objects corresponds to each of the nodes in a DOM tree. The web browser 111 interprets the web content based on predetermined rules and visually displays the web content on a display device (S41). Moreover, the screen reader 112 interprets the web content based on predetermined rules and converts the web content into reading information (S42). This reading information contains text information and attribute information. Generally, the text information is displayed on the display device by the web browser 111 but the attribute information is not displayed. Note that the screen reader 112 has a function of pointing to an approximate part or location with a mouse cursor on the display device, the approximate part being read by the text-to-speech engine 113.

The text-to-speech engine 113 interprets the reading information (not only the text information but also the attribute information) based on predetermined rules and reads the information with natural intonation through a speaker (speaker device) (S43). Here, the order of reading the information may be fixed but is preferably set to be changeable according to an operation of a keyboard (input device) by the user U. For example, in the case where the down arrow key on the keyboard is pressed during a reading corresponding to an upper heading, the reading is changed to a reading corresponding to a lower heading. Moreover, in the case where the user U feels uncomfortable with the reading, in other words, there is an accessibility flaw or error in the reading, he/she performs an operation (specification operation) of pointing out the flaw. This operation can be executed, for example, when the control key and H key on the keyboard are pressed at the same time. When such a specification operation is performed by the user U (S44), the reporter 114 stores the specification operation and a subsequent operation (for example, pressing the down arrow key described above) as an operation history (S45).

Figure 4:
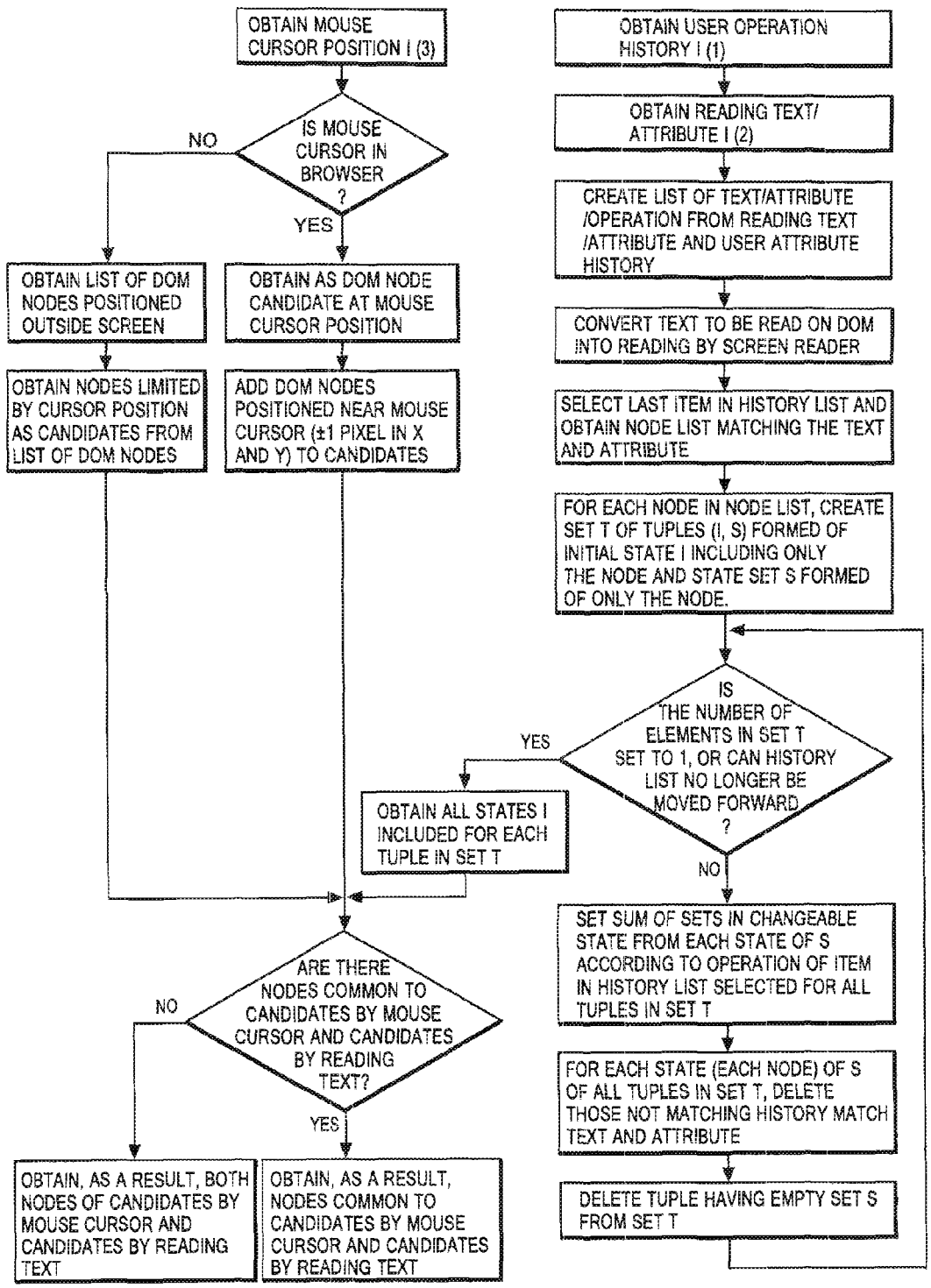
FIG. 4 is a flowchart showing, in greater detail, an identification process by the reporter.

The reporter 114 identifies a part (a specific object in corresponding web content) in which the user U feels uncomfortable with the reading (S46). FIG. 4 is a flowchart showing, in greater detail, an identification process by the reporter 114. In this embodiment, an identification result R1 based on an operation history I (1) of the user U and reading information (text information/attribute information) I (2), which are shown on the right side of FIG. 4 and an identification result R2 based on a mouse cursor position I (3) on a screen of the display device, which is shown on the left side of FIG. 4 are obtained. Then, an identification result R is finally obtained based on the both identification results R1 and R2.

Figure 5:
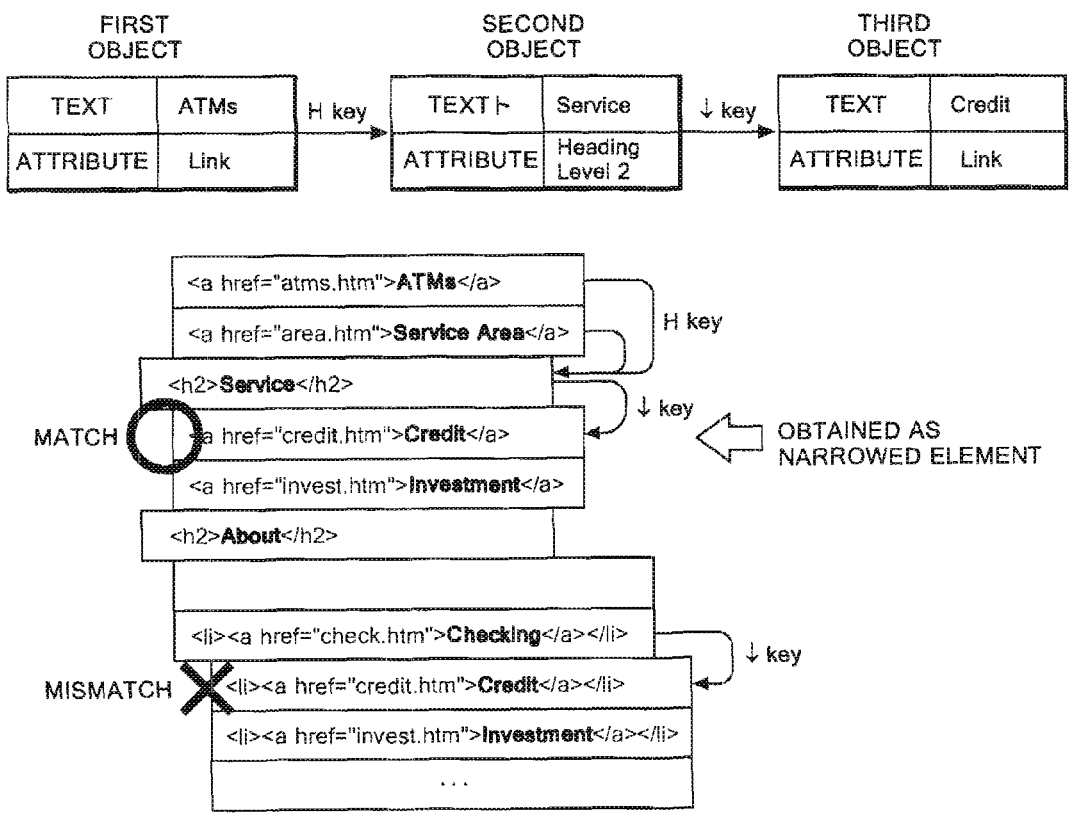
FIG. 5 is a schematic diagram showing a process of obtaining the identification result based on the operation history and the reading information.

FIG. 5 is a schematic diagram showing a process of obtaining the identification result R1 based on the operation history I (1) and the reading information I (2). In the upper part of FIG. 5, the operation history I (1) and the reading information I (2) are shown as being separated into three objects corresponding to each of the operations by the user U.

For example, a first object is "<a href="ATMs.htm">ATMs</a>", and its reading information is "Link ATMs". In the reading information, text information is "ATMs" and attribute information is "Link". The upper part of FIG. 5 shows the following. Specifically, the reading information of the first object is read by the text-to-speech engine 113 and then the control key and H key on the keyboard are pressed at the same time by the user U. Next, reading information of a second object is read and then the down arrow key is pressed by the user U. Furthermore, reading information of a third object is read. Meanwhile, the lower part of FIG. 5 shows a list of DOM nodes corresponding to a plurality of objects including the first to third objects.

For example, in the case where attention is focused on text information and attribute information of the third object (in the case where attention is focused on tags corresponding to a match/mismatch between words in the text information and in the attribute information), it is found that there are two candidates of DOM nodes corresponding to the third object. However, in consideration of the operation history (the down arrow key) of the user U as well as text information and attribute information of the second object, the candidates of DOM nodes corresponding to the third object are narrowed down to one (upper one). As a result, the part where the user U pressed the control key and H key at the same time (in other words, the user felt uncomfortable with the reading) can be identified to be "<a href="ATMs.htm">ATMs</a>" (or "<a href="area.htm">ServiceArea</a>" read around that part). Note that, although the specific object is identified based on the operation history after the specification operation is performed by the user U in this embodiment, the present invention is not limited to that. The specific object may be identified based on an operation history before the specification operation or on the operation histories before and after the specification operation.

The identification result R2 based on the mouse cursor position I (3) can be obtained by utilizing the function of the screen reader 112 for pointing to an approximate part with the mouse cursor on the display device, the approximate part being read by the text-to-speech engine 113. Note that, when a position to be pointed to is outside the window region of the web browser 111, an object present within the window region may be used as a candidate to obtain the identification result R2.

Next, the reporter 114 creates a report (S47 in FIG. 3). This report includes the identification result R, a comment C made by the user U concerning specific accessibility flaw, failure, for example, the operation history I (1), the reading information I (2), dump data I (4) on the DOM list, and screen dump data I (5) in the user terminal 101. All of the above are for more accurately and more easily notifying the community members of a problematic part related to accessibility. This report is uploaded to the accessibility server 102 from the user terminal 101 (S5 in FIGS. 3 and 1).

E-mails or various messages indicating the event that the report has been uploaded are transmitted to the member terminals 103 (1) to 103 (n) (S6 in FIG. 1). Based on the uploaded report and the web content from the web server 202, the members C (1) to C (n) of the community identify an error part pointed out by the user U and create accessibility metadata to improve and correct the error part (S7 in FIG. 1). In this event, the members C (1) to C (n) can more accurately and more easily understand the problematic part related to accessibility by utilizing the identification result R, the comment C made by the user U, the operation history I (1), the reading information I (2), the dump data I (4) on the DOM list, and the screen dump data I (5) in the user terminal 101.

Figure 6:
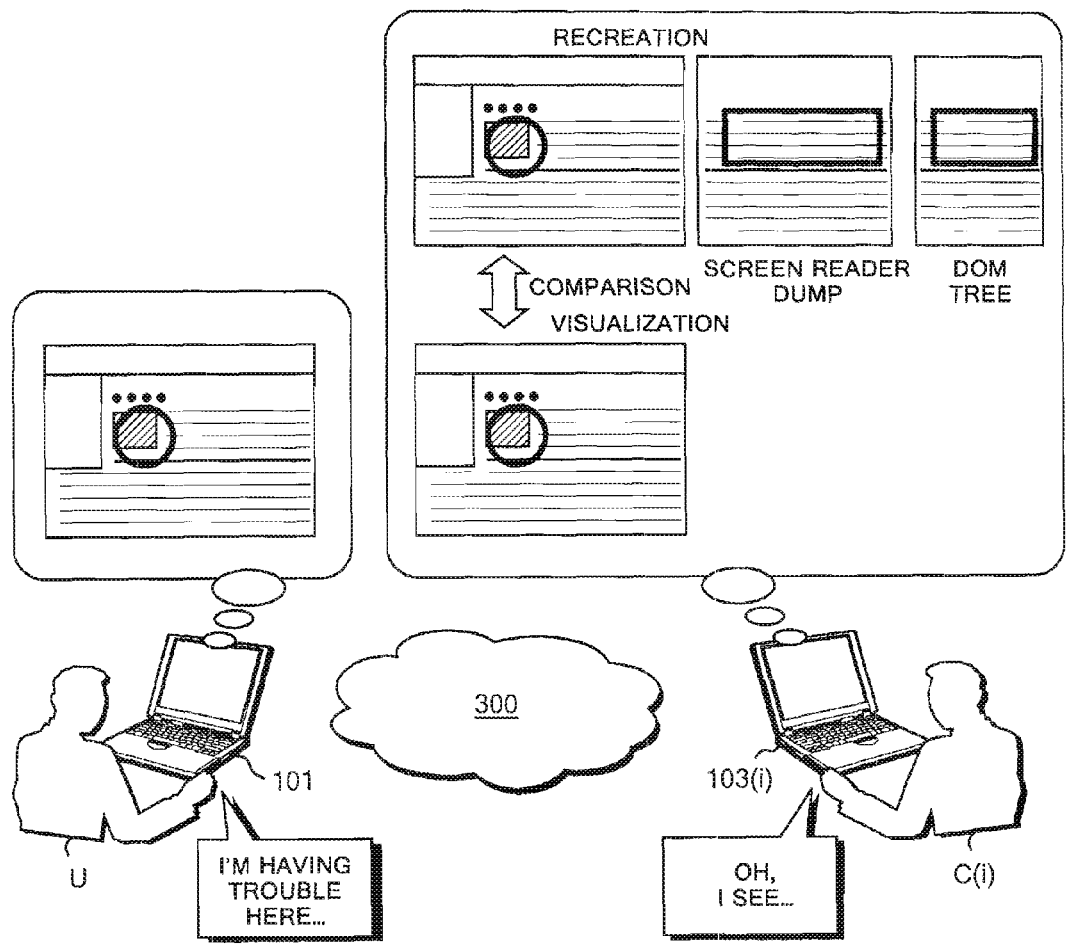
FIG. 6 is a schematic diagram showing cooperation between the user who is visually impaired and the member of the community.

FIG. 6 is a schematic diagram showing cooperation between the user U who is visually impaired and the member C (i) of the community. Advantages of the cooperation are as follows. First, the member C (i) can more accurately recognize a problematic part in the DOM since he/she can obtain the identification result R and the comment C. Second, since the member C (i) can obtain the identification result R, the dump data I (4) on the DOM list and the screen dump data I (5) in the user terminal 101, he/she can visually understand the environment of the user U when the user U has pointed out the problem. Third, since the member C (i) can obtain the identification result R, the operation history I (1) and the reading information I (2), he/she can recreate on his/her own member terminal 103 (i) the environment of the user U when the user U has pointed out the problem. Fourth, through visualization of the problematic part in the environment of the user U and reproduction of the problematic part in the environment of the member C (i), then both can be compared with each other.

After that, the accessibility metadata is uploaded to the accessibility server 102 from the member terminal 103 (i) (S8 in FIG. 1). In the case where the user U accesses the web content again, the accessibility metadata is downloaded into the user terminal 101 from the accessibility server 102 (S9 in FIGS. 1 and 3) to allow the web content to be correctly read by the user terminal 101 (S4' in FIGS. 1 and 3).

Figure 7:
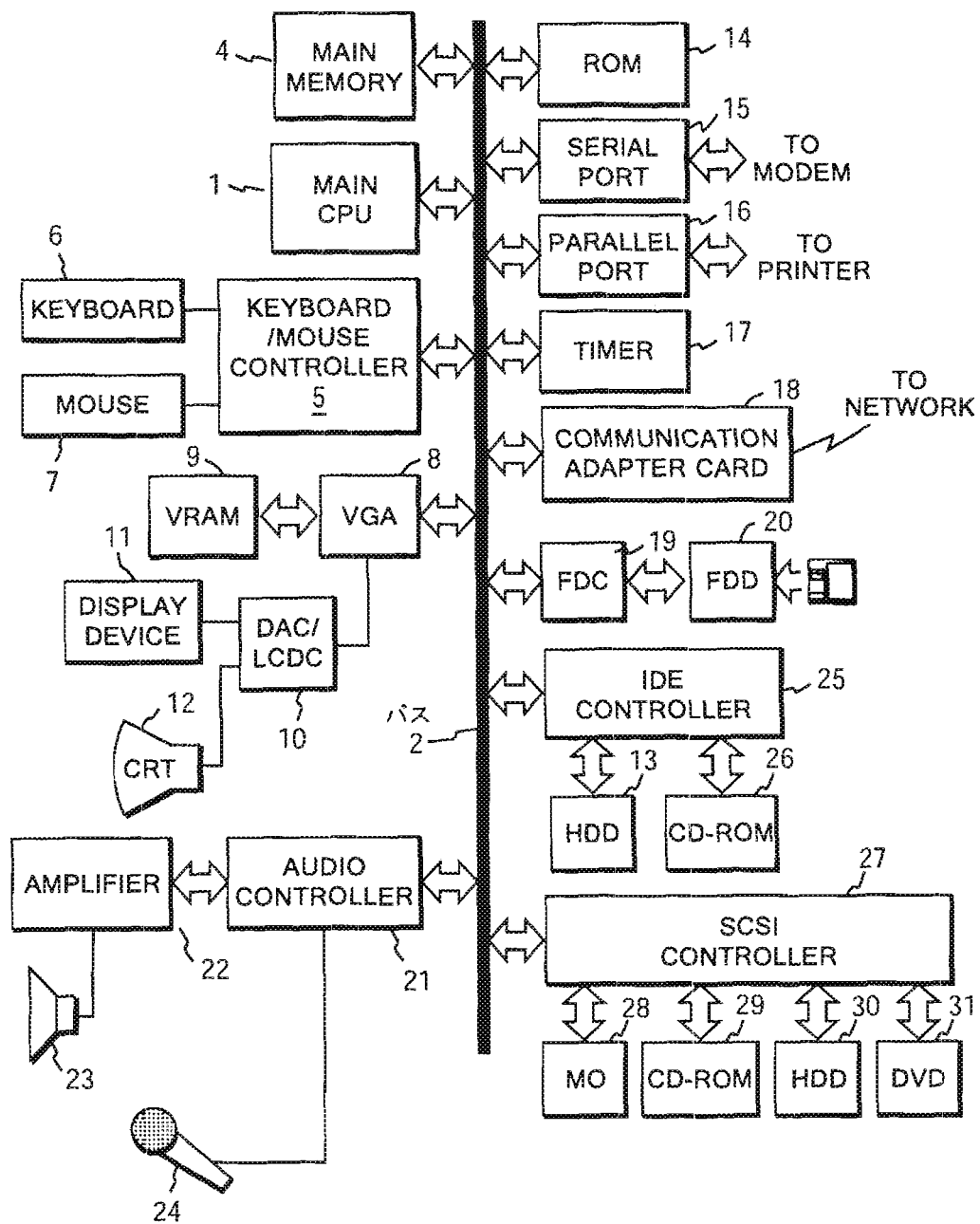
FIG. 7 shows an example of a hardware configuration of an information processor (computer) suitable for implementing the user terminal.

FIG. 7 shows an example of a hardware configuration of an information processor (computer) suitable for implementation of the user terminal 101. The information processor includes a main CPU (Central Processing Unit) 1 and a main memory 4, both of which are connected to a bus 2. Moreover, removable storage (external storage systems having replaceable recording media) such as hard disk drives 13 and 30, CD-ROM drives 26 and 29, a flexible disk drive 20, an MO (magneto optical memory device) drive 28 and a DVD drive 31 are connected to the bus 2 through a floppy disk controller 19, an IDE controller 25, an SCSI controller 27, for example.

Storage media such as a flexible disk, an MO, a CD-ROM and a DVD-ROM are inserted into the removable storage slots. In these storage media, inserted into the hard disk drives 13 and 30, and a ROM 14, the code of a computer program for implementing the present invention by giving a command to the CPU, for example, in cooperation with the operating system, can be recorded. The computer program is executed by being loaded into the main memory 4. The computer program can also be recorded on a plurality of media by being compressed or divided into a plurality of parts.

The information processor receives an input from an input device, such as a keyboard 6 and a mouse 7, through a keyboard/mouse controller 5. The information processor is connected, through a DAC/LCDC display controller 10, to a display device 11 for representing visual data to a user.

The information processor is connected to a network through a network adapter 18, an Ethernet (trademark) card, or a token ring card for example, and thus can communicate with different computers or devices. Although not shown in FIG. 7, the information processor can also be connected to a printer through a parallel port or to a modem through a serial port.

In this embodiment, the description was given on the assumption that the user terminal 101 is a desktop personal computer. However, as the user terminal 101, various types of information processors can be used, such as a PDA (Personal Digital Assistant), a notebook (or laptop) personal computer and a smartphone. As an example, in the case where the user terminal 101 is a notebook or desktop personal computer, an operating system such as Microsoft Windows (trademark) and a standard web browser such as Internet Explorer (trademark) and Firefox (trademark) can be installed.

The present invention can be implemented as hardware, software or a combination of both. In execution by the combination of hardware and software, execution in a data processing system having a predetermined program is a typical example. In this case, the predetermined program is loaded into the data processing system and executed there to control the data processing system and carry out the processing according to the present invention. This program includes command groups that can be expressed by any appropriate language, code or notation. Such command groups allow a system to execute specific functions directly or after any one of or both of conversion to another language, code or notation; and copying onto another medium, are performed.

Of course, not only such a program itself but also a medium having the program recorded on it is included in the scope of the present invention. A program for executing the functions of the present invention can be stored in any computer-readable recording medium such as a flexible disk, an MO (magneto-optical storage), a CD-ROM, a DVD, a hard disk drive, a ROM, an MRAM and a RAM. Such a program, to be stored in the recording medium, can be downloaded from another data processing system connected through a communication line or can be copied from another recording medium. Moreover, the program can also be stored in a single or a plurality of recording media by being compressed or divided into a plurality of parts. Moreover, it should be noted that, of course, a program product for implementing the present invention can also be provided in various modes.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A computer for identifying problems concerning accessibility in content, the computer comprising:
a memory;
a processor coupled to said memory;
a persistent storage device coupled to said memory and said processor;
a display device coupled to said memory and said processor;
a screen reader software module stored in said persistent storage device;
a text-to-speech engine software module stored in said persistent storage device;
a speaker device coupled to said memory and said processor;
an input device coupled to said memory and said processor; and
a reporter software module stored in said persistent storage device;
wherein said processor is operative to:
cause said display device to display web content comprising a plurality of structured objects;
load said screen reader software module from said persistent storage into said main memory and execute said screen reader software module to convert said web content into reading information;
load said text-to-speech engine software module from said persistent storage into said main memory and execute said text-to-speech engine software module to read said reading information as an audible reading through said speaker device to a user of said computer;
obtain a specification operation input from said user, said specification operation input being indicative of a flaw in said web content manifested in said audible reading;
load said reporter software module from said persistent storage into said main memory and execute said reporter software module to:
obtain an operational history including a plurality of operations between said user and said computer controlling an order of reading said reading information, said plurality of operations including said specification operation input; and
determine which of said plurality of structured objects is associated with said flaw in said web content manifested in said audible reading,
wherein the web content is described in a document object model (DOM) and the plurality of structured objects correspond to a plurality of DOM nodes, and
wherein said processor is further operative to execute said reporter software module to determine which of said plurality of structured objects is associated with said flaw in said web content manifested in said audible reading by determining an identification result by examining at least a portion of said DOM nodes corresponding to a portion of said operational history adjacent said specification operation input.

2. The computer according to claim 1, wherein the speaker device may change a reading order in response to operations by the user.

3. The computer according to claim 1, wherein the reading information corresponding to one object and the reading information corresponding to another object are separate.

4. The computer according to claim 1, wherein:
said identification result comprises a first identification result;
said input device comprises said keyboard and a pointer device;
said pointer device automatically points to an approximate screen location on said display device during said audible reading, said approximate screen location approximating a corresponding portion of said reading information;
said specification operation input is received via said keyboard;
said processor is further operative to execute said reporter software module to determine which of said plurality of structured objects is associated with said flaw in said web content manifested in said audible reading by:
determining a second identification result based on said approximate screen location; and
combining said first identification result and said second identification result to determine which of said plurality of structured objects is associated with said flaw in said web content manifested in said audible reading.

5. The computer according to claim 4, wherein when said approximate screen location is outside a display area of the web content in the display device, said processor is further operative to execute said reporter software module to determine said second identification result from among those of said structured objects present within the display area.

6. The computer according to claim 1, further comprising:
a communication device for communicating with other computers; and
an uploading device for uploading that one of said plurality of structured objects determined to be associated with said flaw in said web content manifested in said audible reading to the other computers through the communication device.

7. The computer according to claim 6, wherein the uploading device uploads that one of said plurality of structured objects determined to be associated with said flaw in said web content manifested in said audible reading together with a comment by the user to at least one of the other computers.

8. The computer according to claim 6, wherein the uploading device uploads that one of said plurality of structured objects determined to be associated with said flaw in said web content manifested in said audible reading in a mode that allows visual display of that one of said plurality of structured objects determined to be associated with said flaw in said web content manifested in said audible reading in at least one of the other computers and in a mode that allows reproduction, in at least one of the other computers, of a computing environment of said user corresponding to a time of said flaw in said web content manifested in said audible reading.

9. The computer according to claim 1, further comprising:
a communication device for communicating with other computers; and downloading device for downloading accessibility metadata corresponding to that one of said plurality of structured objects determined to be associated with said flaw in said web content manifested in said audible reading from at least one other computer through the communication device;

wherein the processor is further operative to execute said screen reader software module to convert said web content into said reading information based on the predetermined rules and the accessibility metadata.

10. A computer implemented method of identifying problems concerning accessibility in content, comprising the steps of:

displaying on a display device web content containing a plurality of structured objects;

converting the web content into reading information based on predetermined rules;

reading the converted reading information through a speaker device, as an audible reading, to a user of the computer;

obtaining a specification operation input from said user, said specification operation input being indicative of a flaw in said web content manifested in said audible reading;

obtaining an operational history including a plurality of operations between said user and said computer controlling an order of reading the converted reading information, said plurality of operations including said specification operation input; and determining which of said plurality of structured objects is associated with said flaw in said web content manifested in said audible reading;

wherein the steps are carried out by a single computer, wherein the web content is a described in a document object model (DOM) and the plurality of structured objects correspond to a plurality of DOM nodes, and wherein the method further comprises determining an identification result by examining at least a portion of said DOM nodes corresponding to a portion of said operational history adjacent said specification operation input.

11. The method according to claim 10, further comprising changing the reading order in response to operations by the user.

12. The method according to claim 10, wherein:

said identification result comprises a first identification result;

said specification operation input is received via a keyboard;

further comprising automatically pointing, with a pointer device, to an approximate screen location on said display device during said reading, said approximate screen location approximating a corresponding portion of said reading information;

wherein said determining which of said plurality of structured objects is associated with said flaw in said web content manifested in said audible reading comprises:

determining a second identification result based on said approximate screen location; and combining said first identification result and said second identification result to determine which of said plurality of structured objects is associated with said flaw in said web content manifested in said audible reading.

13. The method according to claim 12, wherein when said approximate screen location is outside a display area of the web content in the display device, the method further comprises:

determining said second identification result from among those of said structured objects present within the display area.

14. The method according to claim 10, further comprising:

uploading that one of said plurality of structured objects determined to be associated with said flaw in said web content manifested in said audible reading to other computers through a communication device in a mode that allows visual display of that one of said plurality of structured objects determined to be associated with said flaw in said web content manifested in said audible reading in at least one of the other computers and in a mode that allows reproduction, in at least one of the other computers, of a computing environment of said user corresponding to a time of said flaw in said web content manifested in said audible reading.

15. The method according to claim 14, wherein the single computer and the other computers comprise terminals of a social accessibility system of a community that approves social accessibility.

16. The method according to claim 10, further comprising:

downloading accessibility metadata corresponding to that one of said plurality of structured objects determined to be associated with said flaw in said web content manifested in said audible reading from at least one other computer through a communication device; and converting the web content into said reading information based on the predetermined rules and the accessibility metadata.

* * * * *